June 15, 1954  E. C. SMITH  2,681,001
CHARCOAL PLANKER
Filed Oct. 23, 1950
3 Sheets-Sheet 1
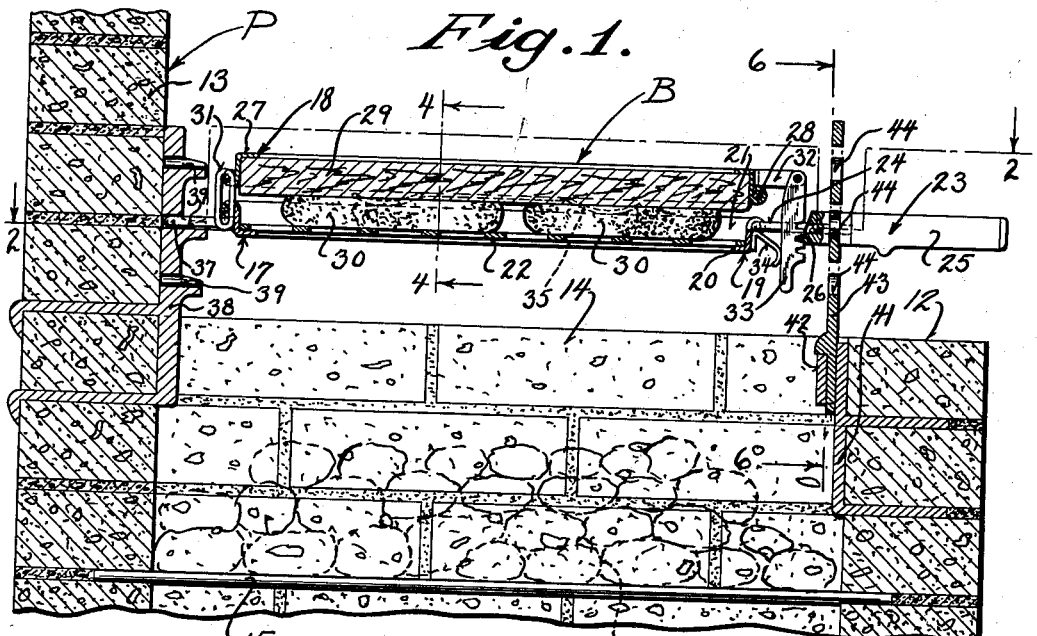
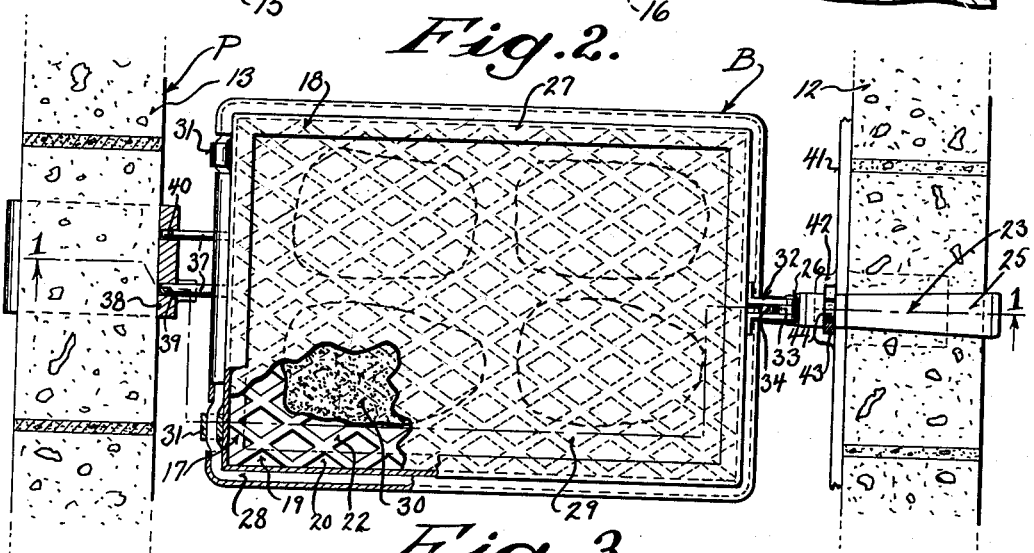
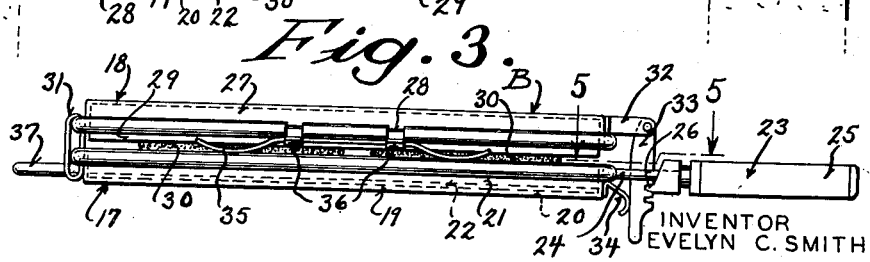
INVENTOR
EVELYN C. SMITH
BY *Morey Wright*
ATTORNEYS June 15, 1954
E. C. SMITH
2,681,001
CHARCOAL PLANKER
Filed Oct. 23, 1950
3 Sheets-Sheet 2
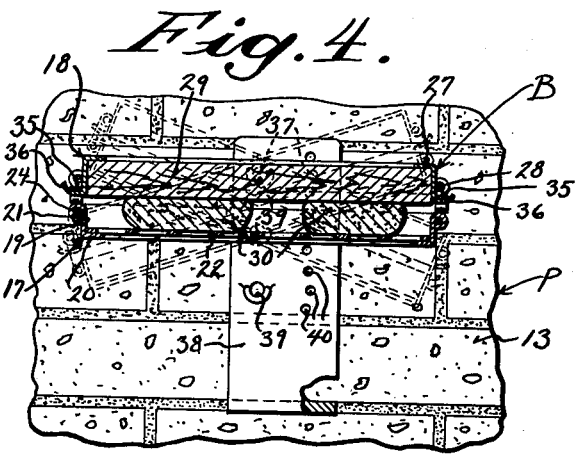
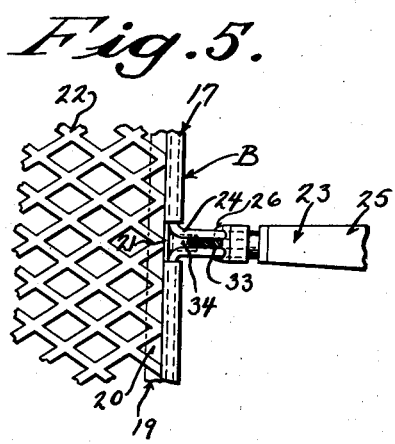
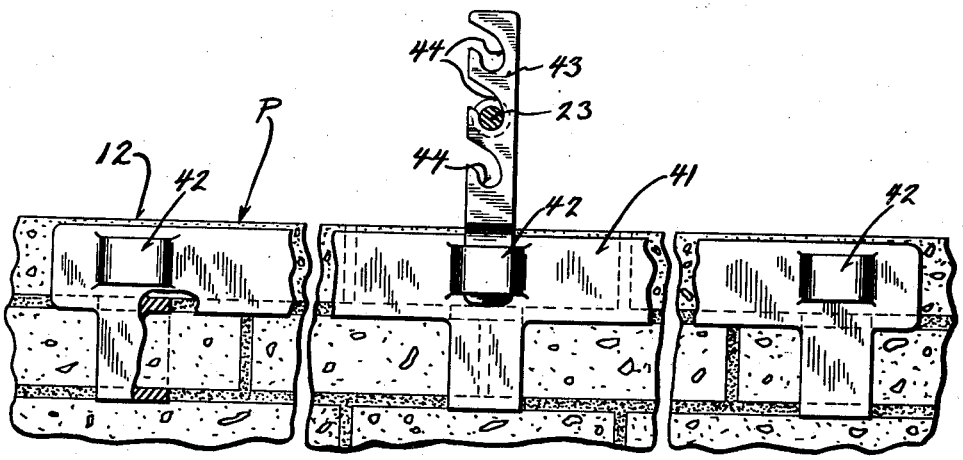
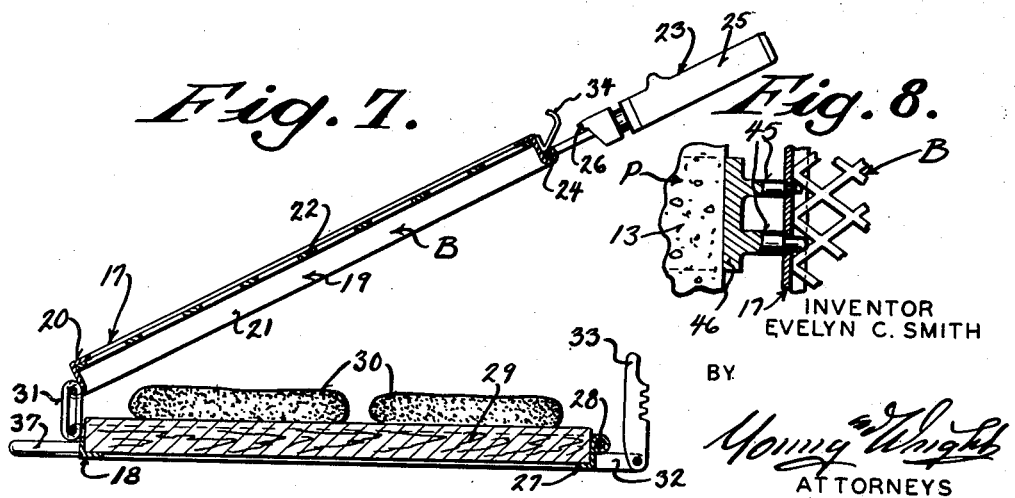
INVENTOR
EVELYN C. SMITH
BY
Young Wright
ATTORNEYS June 15, 1954  E. C. SMITH  2,681,001
CHARCOAL PLANKER
Filed Oct. 23, 1950

INVENTOR
EVELYN C. SMITH

BY

ATTORNEYS

Patented June 15, 1954

2,681,001

UNITED STATES PATENT OFFICE 2,681,001

CHARCOAL PLANKER

Evelyn C. Smith, Port Washington, Wis.

Application October 23, 1950, Serial No. 191,610

1 Claim. (Cl. 99—402)

This invention appertains to the barbecuing or broiling of food stuffs, such as fish, steaks, chops etc., and more particularly to a novel broiler or planker for use in barbecuing pits.

One of the primary objects of my invention is to provide a novel broiler for barbecuing pits, so constructed that both the fish and the plank, or the meat and the sizzling platter, as the case may be, are effectively and properly held within the broiler, so that when the food is cooked, the same with the plank or platter can be quickly removed together, as a unit, and served directly on the table.

Another salient object of the invention is the provision of means whereby the two sections of the broiler can be held varying distances apart so as to hold planks and platters and foods of different thicknesses.

A further important object of the invention is the provision of means for resiliently supporting one section of the broiler on the other section of the broiler so as to prevent the plank from resting too firmly on the fish being cooked.

A further important object of the invention is the provision of novel means for associating the broiler with a barbecue pit, so that the broiler can be held at different distances from the coals or other source of heat and at different angles, in case the heat is greater at one side of the broiler than the other.

A still further object of my invention is to provide an improved fish planking device, which can be easily taken apart and cleaned.

With these and other objects in view, the invention consists in the novel construction, arrangement and formation of parts, as will be hereinafter more specifically described and claimed, and illustrated in the accompanying drawings, in which drawings, Figure 1 is a vertical sectional view through a portion of a barbecuing pit, showing my improved device associated therewith, the section being taken substantially on the line 1—1 of Figure 2, looking in the direction of the arrows.

Figure 2 is a horizontal sectional view taken on the line 2—2 of Figure 1, looking in the direction of the arrows and showing the broiler in plan, with parts thereof broken away and in section.

Figure 3 is a side elevational view of the broiler itself removed from the pit.

Figure 4 is a detail sectional view taken at right angles to Figure 1, and on the line 4—4 of Figure 1, showing the different angular positions of the broiler in dotted lines.

Figure 5 is a detail, horizontal sectional view through the broiler, taken on the line 5—5 of Figure 3, looking in the direction of the arrows, showing the removable lower grid.

Figure 6 is a sectional view through the pit taken on the line 6—6 of Figure 1, looking in the direction of the arrows, illustrating one type of means employed for adjustably supporting the forward end of the broiler.

Figure 7 is a longitudinal sectional view through the broiler showing one section swung open to a partially raised position to permit the removal of the plank from the broiler.

Figure 8 is a fragmentary detail, horizontal sectional view, showing an improved form of means for supporting the broiler in the pit.

Referring to the drawings in detail, wherein similar reference characters designate corresponding parts throughout the several views, the letter B generally indicates my novel broiler for use with a barbecue pit P.

Figure 9:
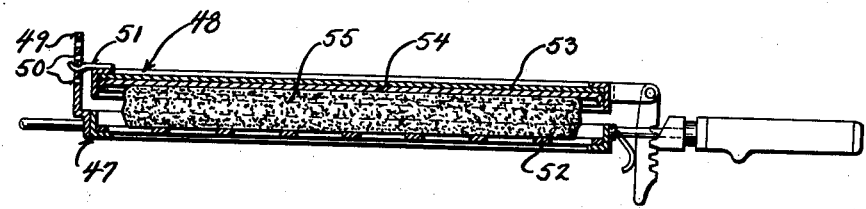
Figure 9 is a longitudinal sectional view through a modified form of the broiler and illustrating the use of a sizzling platter therein, the section being taken on the line 9—9 of Figure 10, looking in the direction of the arrows.

The barbecue pit P can be of any preferred form or character, and as illustrated includes front and rear walls 12 and 13 and end walls 14. These walls can all be formed from fire brick and the same support a grid 15 for holding coals 16. The parts of the pit P above described are common, and I make no claim thereto but, however, I do provide special means, which will be later specifically described for supporting my broiler B.

The broiler B includes a pair of similar sections 17 and 18, and for the purpose of describing the device, the section 17 can be considered as the lower part and the section 18 as the upper part. The section 17 includes an open rectangular frame 19, preferably formed from angle strips so as to provide a bottom inwardly directed flange 20 and a marginal wall 21. The flange 20 supports an open grid 22, which can be fashioned from any suitable material, such as expanded metal, but it is to be understood that I do not limit myself to expanded metal, as obviously, the same can be made from crossed rods or strips, or reticulated sheets. For the purpose of cleanliness, the grid 22 can be removable, if so desired.

Rigidly secured to the forward end of the section 17, is a manipulating handle 23. As illustrated a reinforcing rod or wire 24 is extended about the marginal frame and the upper edges of the walls 21 are coiled over this reinforcing wire or rod. The ends of the wire are extended to form the handle and a hand grip of nonheat conducting material 25 is secured to the ends of the rod or wire. The inner end of the hand grip is provided with a tooth 26, for a purpose, which will be later described.

The section 18 is constructed very similar to the section 17, and hence includes an open marginal frame 27 formed from an angle strip or strips, and this frame is also reinforced by a wire or rod 28. The marginal frame removably receives and supports a plank 29 on which fish or the like 30 can be effectively broiled or cooked. The inner ends of the sections 17 and 18 are adjustably and pivotally connected together by a pair of loops 31 which loosely receive portions of the reinforcing wires or rods 24 and 28. The forward end of the section 21, has rigidly secured thereto a bracket 32 and this bracket pivotally supports a toothed latch 33. The latch 33 extends between the terminals of the lower reinforcing wire 24 and this latch is normally urged toward the tooth 26 by a leaf spring 34 carried by the lower section. By pressing in on the latch 33, the same can be disengaged from the tooth 26 and the latch and the section 18 can be swung up and down so as to permit the tooth 26 to engage in different keeper recesses in the latch so that the forward end of the section 18 can be held varying distances relative to the lower section 17.

It is also preferred to place between the sections 17 and 18 bowed leaf springs or the like 35. These springs can be carried by the section 18 and the resilient ends of the spring can rest upon the section 17, so as to prevent undue pressure down on the fish being cooked. As best shown in Figure 3, the springs 35 can be held in place by ears 36, struck out from the rolled edge of the frame 27.

The inner end of the lower frame 17 can carry a pair of spaced outwardly extending pins 37, which are adapted to engage a part of the barbecue pit, and as clearly shown in Figures 1 and 2, the inner end of the broiler is supported by these pins 37, and the outer or forward end of the broiler is supported on the pit by the handle 23.

In accordance with my invention, the rear wall 13 of the pit has anchored therein a bracket and this bracket at spaced points is provided with a vertical row of sockets 39. The bracket is further provided along side of each one of the sockets 39, with a series of smaller openings 40, preferably arranged in an arc of a circle (see Figure 4). The sockets 39 are preferably provided with a lower arcuate outwardly extending reinforcing flange and this flange functions to further support the pins 37.

In use of the broiler, one pin is inserted in a socket 39, at a desired height and the other pin is then inserted in any selected opening 40, adjacent to the socket so that the broiler can either be held in a horizontal plane, should the heat be even, or at any desired angular position relative to the horizontal, should the heat be greater near one side of the broiler. While I have shown a single row of sockets 39, it is to be also understood that the row of sockets 39 and the openings 40 could be duplicated so that the broiler can be adjusted along the pit.

The front wall 12 of the pit P has anchored thereto a supporting plate 41 and this plate is provided at spaced points with sockets 42 for detachably receiving an upright arm 43, as best shown in Figures 1 and 6. The upright arm 43 is provided at spaced points with bayonet slots 44 for detachably receiving the forward end of the handle 23. The formation of the slots 44 is such that the handle can be turned therein and easily removed therefrom.

As illustrated in Figure 7, the broiler is placed with the section 18 lowermost, and the plank 29 is then placed in the section 18, after which the fish is placed on the exposed surface of the plank. The section 17 is then swung down and locked in the preferred adjusted position by the latch 33. The broiler is then inverted so that the section 17 will be lowermost with the fish facing the grid 22. The broiler is now associated with the pit P as previously described, and when the fish is cooked, the broiler is bodily removed from the pit and the section 18 is again placed lowermost. The section 22 is raised and the plank 29 with the fish is bodily lifted from the broiler and placed on the table with the fish ready to be served.

Figure 10:
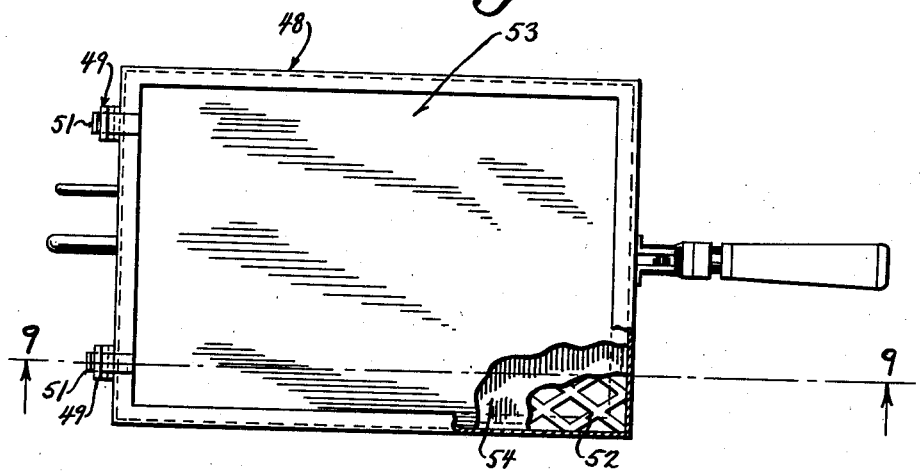
Figure 10 is a top plan view of the modified form of the broiler, with parts thereof broken away and in section to illustrate structural detail.
Figure 11:
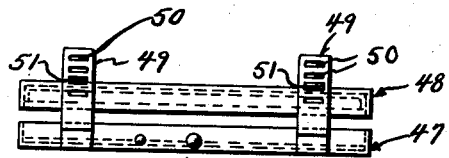
Figure 11 is a rear elevational view of the modified form of the broiler.

Also forming a part of my invention is the use of a platter in lieu of the plank 29, for broiling steaks, chops and the like, and in Figures 9 to 11, inclusive, I have shown this arrangement in conjunction with a slightly modified form of the invention.

It is to be also understood that various changes in details can be made to the broiler and the method of supporting the broiler in the pit. For instance (see Figure 8), the pins 37 need not be carried by the broiler but can be carried by the pit. Thus, as shown in Figure 8, pins 45 can be formed on a bracket 46 anchored to the rear wall 13 of the pit P and the broiler B can have its frame provided with sockets for the reception of the pins. Likewise chains could be used for supporting the broiler.

Now, referring to Figures 9, 10 and 11 it can be seen that the modified form of the device also includes substantially like sections 47 and 48. In this form, the inner end of the section 48 carries upstanding brackets 49 having a series of spaced slots 50 therein. The inner end of the section 43 carries hooked tongues or hinge leaves 51 and these tongues are inserted within the selective slots 50, so as to obtain a desired adjustment between the sections 47 and 48 and to permit the swinging of the sections relative to one another. The forward ends of the sections 47 and 48 are detachably latched together in the same manner as shown in the first form. In the modified form, the section 47 receives a grid 52 while the section 48 detachably receives a metallic grid plate 53. Fitted flat against the grid plate 53 is a removable sizzling platter 54 on which steaks 55, chops or the like, can be served directly on the table. In some instances, the grid 53 itself can be used as a sizzling serving platter and where the same is used as a grid, it can be perforated, if preferred.

From the foregoing description, it can be seen that I have provided a novel broiler for planking fish and for broiling and serving steaks on sizzling platters.

It is to be also understood that an open grid formed from expanded metal or other desired material can be used in both of the sections of the broiler where necessary or desirable.

Various other changes in details may be made without departing from the spirit or the scope of this invention, but what I claim as new is:

A broiler for cooking foods in a barbecue pit comprising a pair of like companion sections each including an open rectangular frame, a rectangular grid carried by one section, a serving platter removably carried by the other section, said serving platter being adapted to snugly and removably fit in the rectangular frame of said other section, the food being cooked being received by the grid and the platter, means hingedly connecting the sections together, a manipulating handle carried by one end of said first mentioned section, spaced supporting pins carried by the opposite end of said other section, an inwardly projecting tooth secured adjacent the inner end of said manipulating handle, a spaced forwardly projecting leaf spring adjacent to and spaced from said tooth carried by said first frame section, and a toothed latch pivotally supported by said other frame section and adapted to be received between said leaf spring and said tooth to adjustably support one section above the other section.

References Cited in the file of this patent

UNITED STATES PATENTS

| Number | Name | Date |
|---|---|---|
| 466,154 | Burriss | Dec. 29, 1891 |
| 706,502 | Van Wie | Aug. 5, 1902 |
| 914,159 | McCaughey | Mar. 2, 1909 |
| 1,010,981 | Taylor | Dec. 5, 1911 |
| 1,040,916 | Fell | Oct. 8, 1912 |
| 1,300,504 | Speaks | Apr. 15, 1919 |
| 1,661,294 | Lemaster | Mar. 6, 1928 |
| 1,712,474 | Serrell | May 7, 1929 |
| 1,880,205 | Krag | Oct. 4, 1932 |
| 2,168,604 | Lee | Aug. 8, 1939 |
| 2,199,303 | Damon | Apr. 30, 1940 |
| 2,297,825 | Bobo | Oct. 6, 1942 |
| 2,423,963 | Coffman | July 15, 1947 |
| 2,542,109 | Benson | Feb. 20, 1951 |
| 2,576,028 | Mitchell | Nov. 20, 1951 |

FOREIGN PATENTS

| Number | Country | Date |
|---|---|---|
| 7,622 | Great Britain | 1891 |
| 770,794 | France | Sept. 20, 1934 |